United States Patent
Takata (10) Patent No.: US 10,618,251 B2
(45) Date of Patent: Apr. 14, 2020

(54) SOUND-ABSORBING MATERIAL AND WIRE HARNESS PROVIDED WITH SOUND-ABSORBING MATERIAL

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yutaka Takata, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 189 days.

(21) Appl. No.: 15/545,859

(22) PCT Filed: Jan. 9, 2016

(86) PCT No.: PCT/JP2016/050586
§ 371 (c)(1),
(2) Date: Jul. 24, 2017

(87) PCT Pub. No.: WO2016/121467
PCT Pub. Date: Aug. 4, 2016

(65) Prior Publication Data
US 2018/0015689 A1   Jan. 18, 2018

(30) Foreign Application Priority Data

Jan. 30, 2015   (JP) ................. 2015-016940

(51) Int. Cl.
*B32B 5/26* (2006.01)
*B60R 13/08* (2006.01)
(Continued)

(52) U.S. Cl.
CPC ............ *B32B 5/26* (2013.01); *B60R 13/0884* (2013.01); *B60R 16/0215* (2013.01);
(Continued)

(58) Field of Classification Search
CPC ... B32B 5/26; B60R 13/0884; B60R 16/0215; G10K 11/168; H01B 7/295; H01B 7/428; H02G 3/0412
(Continued)

(56) References Cited

U.S. PATENT DOCUMENTS 8,496,088 B2 * 7/2013 Kitchen .................. B32B 5/26
  181/290
2004/0231915 A1 * 11/2004 Thompson, Jr. .......... B32B 5/02
  181/290
(Continued)

FOREIGN PATENT DOCUMENTS

JP    2002161465 A    6/2002
JP    2005263118 A    9/2005
(Continued)

OTHER PUBLICATIONS

International Search Report for Application No. PCT/JP2016/050586 dated Mar. 8, 2016, 6 pages.
(Continued)

*Primary Examiner* — Forrest M Phillips
(74) *Attorney, Agent, or Firm* — Reising Ethington, P.C.

(57) ABSTRACT

A sound-absorbing material obtained by stacking nonwoven fabrics that has a structure for both maintaining its sound-absorbing performance and providing flame-retardancy. The sound-absorbing material is obtained by stacking a base
(Continued)

material made of nonwoven fabric and a surface material made of nonwoven fabric, in which a flame-retardant material made of nonwoven fabric having a density that is higher than those of the base material and the surface material is disposed between the base material and the surface material. Also, a wire harness is provided with the sound-absorbing material in which the wire harness and the sound-absorbing material are integrated with each other by covering at least a portion of the wire harness extending in an axial direction, with the sound-absorbing material.

5 Claims, 5 Drawing Sheets

(51) Int. Cl.
    *B60R 16/02*     (2006.01)
    *G10K 11/168*     (2006.01)
    *H01B 7/295*     (2006.01)
    *H01B 7/42*     (2006.01)
    *H02G 3/04*     (2006.01)

(52) U.S. Cl.
    CPC ............ *G10K 11/168* (2013.01); *H01B 7/295* (2013.01); *H01B 7/428* (2013.01); *H02G 3/0412* (2013.01)

(58) Field of Classification Search
    USPC .......................................................... 181/290
    See application file for complete search history.

(56) References Cited

U.S. PATENT DOCUMENTS

| | | | |
|---|---|---|---|
| 2006/0021823 A1* | 2/2006 | Kohara | ..................... B32B 5/24 181/290 |
| 2012/0037447 A1* | 2/2012 | Duval | ...................... B32B 5/22 181/290 |
| 2015/0203058 A1* | 7/2015 | Osada | ................ B60R 13/0243 307/9.1 |
| 2016/0042730 A1 | 2/2016 | Takata | |

FOREIGN PATENT DOCUMENTS

| | | |
|---|---|---|
| JP | 2006160197 A | 6/2006 |
| JP | 2014224648 A | 12/2014 |

OTHER PUBLICATIONS

International Preliminary Report on Patentability for PCT/JP2016/050586, 6 pages.

* cited by examiner

SOUND-ABSORBING MATERIAL AND WIRE HARNESS PROVIDED WITH SOUND-ABSORBING MATERIAL

CROSS REFERENCE TO RELATED APPLICATIONS

This application claims the priority of Japanese patent application JP2015-016940 filed on Jan. 30, 2015, the entire contents of which are incorporated herein.

TECHNICAL FIELD

The present invention relates to a sound-absorbing material using a nonwoven fabric, and a wire harness provided with the sound-absorbing material in which the sound-absorbing material and a wire harness are integrated with each other.

BACKGROUND ART

Conventionally, in order to increase silence in the interior of an automobile, a sound insulation material or a sound-absorbing material that is made of glass wool, rock wool, porous ceramic, urethane foam, waste cotton, or the like is provided in the vicinity of apparatuses that generate noise in a vehicle. However, from the viewpoint of workability of the sound insulation material or the sound-absorbing material, its influence on the human body, its recyclability, environmental impact, a decrease in its weight, and the like, today, nonwoven fabrics are widely used in these sound insulation materials and sound-absorbing materials. Patent Document 1 (JP2002-161465A) below discloses a sound-absorbing material made of a stacked nonwoven fabric partially including ultra fine fibers.

Also, in recent years, performance and functions of automobiles, electric appliances, and the like have been improved rapidly. In order to control various electronic apparatuses provided in these automobiles and electric appliances, multiple electric wires need to be routed inside the automobiles. Ordinarily, these electric wires are used in the form of a wire harness. Wire harnesses are obtained by assembling a plurality of electric wires in advance into a form required for wiring, and formed by providing the necessary branches and attaching connectors to their terminal ends, for example, and then winding tape-shaped, tube-shaped, or sheet-shaped protection materials around the outer circumference of the electric wire bundle.

A wire harness routed inside a vehicle comes into contact with a vehicle body or other members inside the vehicle due to vibration while the vehicle is moving, and makes noise in some cases. Thus, in some cases, the outer circumference of the wire harness is provided with a buffer material for suppressing noise caused by contact with any other member.

SUMMARY OF INVENTION

There is an increasing need for silence in the interior of an automobile along with the spread of EV (electric vehicle) technology in the automobile market in recent years. In order to improve the silence in the interior of the automobile, it is necessary to take measures against noise ranging from low frequencies to high frequencies, such as road noise or wind noise, which also has been an issue with gasoline cars, as well as noise produced from its motor in high frequency ranges of at least 5000 Hz. Various methods have been developed as part of such measures, such as vehicle design giving consideration to a decrease in noise, sound-absorbing materials for absorbing noise over a wide range from low frequencies to high frequencies, and resin members having a sound blocking capability that is equivalent to that of metal components.

Apparatuses generating heat, such as an engine, are also provided inside the vehicle. A sound-absorbing material made of a material with incombustibility or sufficient flame-retardancy is disposed in the vicinity of such an apparatus. However, consideration has to be given also to situations in which a region inside an engine room that does not usually reach a high temperature is temporarily exposed to an abnormally high temperature due to failure of the radiator for example. In particular, a sound-absorbing material made of nonwoven fabric has sound-absorbing properties due to a structure of fibers including many voids, and thus sound-absorbing materials have the weakness that if by any chance the sound-absorbing material catches fire, the fire spreads easily. Thus, since the sound-absorbing materials provided in the vehicle are not limited to those disposed in the vicinity of the apparatus generating heat, their flame-retardancy needs to be considered in addition to their cost and sound-absorbing performance. Usually, if a sound-absorbing material made of combustible fibers is used, flame-retardancy is provided by blending flame-retardant fibers into nonwoven fabric that constitutes the sound-absorbing material, or by applying a flame retardant to its surface, for example. However, the sound-absorbing performance of the sound-absorbing material decreases in some cases due to such processing. Thus, the sound-absorbing materials made of combustible fibers are problematic in that it is difficult to both maintain their sound-absorbing performance and provide them with flame-retardancy.

The present design has been achieved in light of the above-described issues, and provides a sound-absorbing material that is obtained by stacking nonwoven fabrics and has a structure for both maintaining its sound-absorbing performance and providing it with flame-retardancy even if these nonwoven fabrics are made of combustible fibers, and a wire harness provided with the sound-absorbing material in which the sound-absorbing material and the wire harness are integrated with each other.

In order to resolve the above-described issues, the sound-absorbing material according to the present application is a sound-absorbing material obtained by stacking a base material made of nonwoven fabric and a surface material made of nonwoven fabric having a thickness that is smaller than that of the base material, in which a flame-retardant material made of nonwoven fabric having a density that is higher than those of the base material and the surface material is disposed between the base material and the surface material.

It is preferable that in the sound-absorbing material, an airflow rate of a stacked nonwoven fabric obtained by staking the base material, the surface material, and the flame-retardant material is 5 to 50 cm$^3$/cm$^2$·s.

It is preferable that in the sound-absorbing material, the density of the flame-retardant material is less than 0.3 g/cm$^3$.

In the sound-absorbing material, a configuration may be adopted in which at least one layer of the surface material is stacked between a plurality of the base materials.

In order to resolve the above-described issues, in a wire harness provided with the sound-absorbing material according to the present application, the sound-absorbing material and the wire harness are integrated with each other by covering at least a portion of the wire harness extending in an axial direction, with the sound-absorbing material.

According to the sound-absorbing material and the wire harness provided with the sound-absorbing material according to the present application, it is possible to provide a sound-absorbing material having a structure for achieving the maintenance of its sound-absorbing performance and the provision of its flame-retardancy even if the sound-absorbing material is obtained by stacking nonwoven fabrics made of combustible fibers, and a wire harness provided with the sound-absorbing material in which the sound-absorbing material and the wire harness are integrated with each other.

DESCRIPTION OF EMBODIMENTS

Figure 1A:
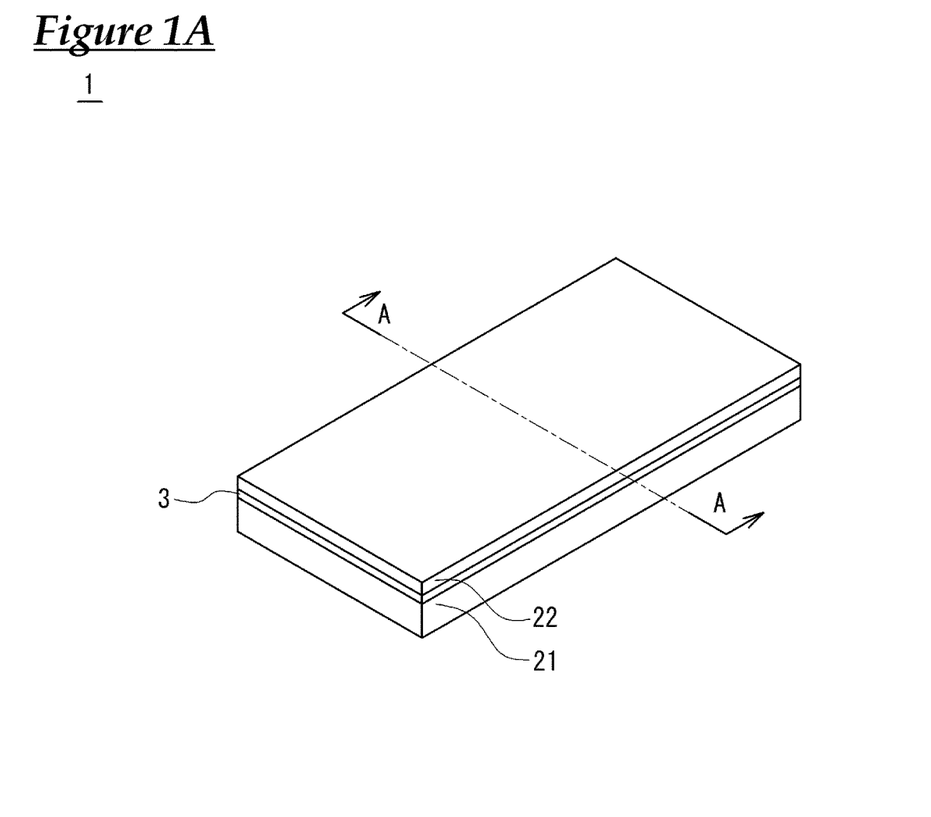
FIG. 1 shows a perspective view of an external appearance of a sound-absorbing material and its cross-sectional view.
Figure 1B:
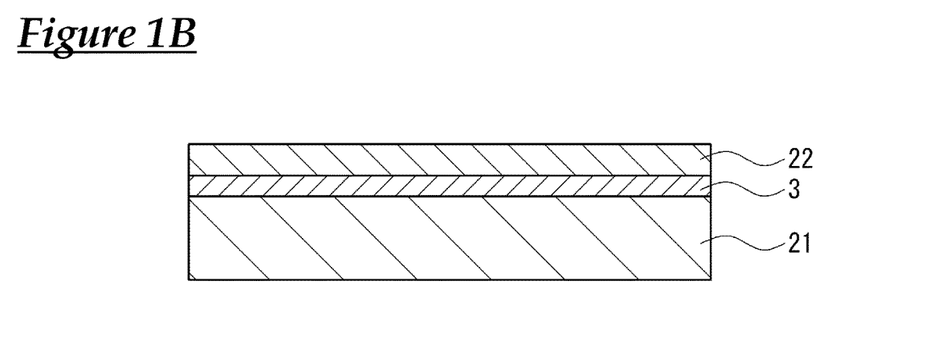

Hereinafter, embodiments will be described in detail with reference to the drawings. FIG. 1(a) shows a perspective view of an external appearance showing one example of a sound-absorbing material according to the present invention, and FIG. 1(b) shows a cross-sectional view taken along line A-A of a sound-absorbing material 1 in FIG. 1(a). The sound-absorbing material and the wire harness provided with the sound-absorbing material can be suitably used as a sound-absorbing material for a vehicle such an automobile, and noise entering the interior of a car from an engine room of an automobile or its outside is blocked by disposing the sound-absorbing material and the wire harness provided with the sound-absorbing material in a dashboard or an inner space of a door of the automobile.

The sound-absorbing material 1 of the present embodiment is a stacked nonwoven fabric constituted by a base material 21, a surface material 22, and a flame-retardant material 3, all of these materials being made of nonwoven fabric. The base material 21 and the surface material 22 are placed on each other in their thickness direction, and the flame-retardant material 3 is placed therebetween. The surface material 22 is made of nonwoven fabric that has a smaller thickness and weight per area than the base material 21, and the flame-retardant material 3 is made of nonwoven fabric that has a density that is higher than those of the surface material 22 and the base material 21. Note that in order to distinguish these layers, in the sound-absorbing material 1 shown in FIG. 1, the surface material 22 and the flame-retardant material 3 are depicted slightly thicker than the actual sizes. The same is also true for FIGS. 2 and 3.

Based on the results of testing conducted by the inventor, even if the base material 21 or the surface material 22 catches fire, it was found that the spread of the fire is delayed by the layer of the flame-retardant material 3 because the flame-retardant material 3, which is made of fibers with a density that is higher than those of the base material 21 and the surface material 22, is disposed between the base material 21 and the surface material 22, and it was confirmed that the overall flame-retardancy of the sound-absorbing material 1 was improved. Note that in the present application, "flame-retardancy" refers to "difficulty in fire spreading", which is a generic term for the property of preventing spread of fire, including slow combustibility and self-extinguishing properties.

In order to optimize its sound absorbing performance, the sound-absorbing material 1 is adjusted such that its airflow rate is in a range of 5 to 50 $cm^3/cm^2 \cdot s$. Note that in the present invention, "airflow rate" refers to a "value measured by the "Frazier Air Permeability Test" in 8. 26. 1 A in JIS L 1096 "Testing methods for woven and knitted fabrics". The Frazier Air Permeability Test can be conducted by measuring airflow rates using a commercially available Frazier tester.

Because the sound-absorbing material 1 has a structure for increasing its flame-retardancy by disposing the flame-retardant material 3 between the base material 21 and the surface material 22, even if combustible fibers are used in the base material 21 and the surface material 22, the sound-absorbing material 1 can be separately provided with flame-retardancy. Also, with this structure, the requirement for flame-retardancy of the base material 21 and the surface material 22 is reduced, and the degree of freedom of fibers that can be used in the base material 21 and the surface material 22 increases, and thus the required sound absorbing performance is met more easily. Furthermore, it is not necessary to apply a flame retardant to the surface of the sound-absorbing material 1, and thus there is no risk that the sound-absorbing performance of the sound-absorbing material 1 will deteriorate due to the flame retardant.

The flame-retardant material 3 is a thin nonwoven fabric having a thickness of 0.2 mm, and functions as a thermally fusible sheet. The base material 21 and the surface material 22 are integrated into the sound-absorbing material 1 by bonding the base material 21 and the surface material 22 to the flame-retardant material 3, which is the thermally fusible sheet. Note that the flame-retardant material 3 does not necessarily have to be a thermally fusible sheet, and these base material 21, surface material 22, and flame-retardant material 3 may also be integrated by other means such as needle punching or stapling. Also, for convenience of providing the flame-retardant material 3 with the thermally fusible sheet, the flame-retardant material 3 is a thin nonwoven fabric in the present embodiment, but the flame-retardant material 3 may have any thickness as long as the flame-retardant material 3 meets the above-described requirement for the air permeability.

It is desirable that the weight per area of the base material 21 is in a range of 100 to 1000 $g/cm^2$, and its thickness is in a range of 1.0 to 50.0 mm. If the weight per area is increased, the sound absorption coefficients in all frequency bands tend to increase, whereas if the weight per area is reduced, the sound absorption coefficients in all of the frequency bands tend to decrease. Also, if the thickness is increased, the sound-absorption performance in low frequency bands tends to increase, whereas if the thickness is reduced, the sound-absorption performance in high frequency bands tends to increase. The thickness of the base material 21 can be adjusted as appropriate in accordance with the frequency band that is to be absorbed.

It is desirable that the weight per area of the surface material 22 is in a range of 10 to 400 $g/m^2$, and its thickness is in a range of 0.1 to 4.0 mm. By making the thickness of the surface material 22 smaller than that of the base material 21, the surface material 22 has better sound absorbing properties in high frequency ranges than the base material 21 and can absorb noise in wider frequency bands. However, if its weight per area and thickness are less than the above-described ranges, there is a risk that the sound-absorption effects of the surface material 22 as the sound-absorbing material will not be exhibited sufficiently.

The weight per area and thickness of the flame-retardant material 3 are adjusted such that a density ρ calculated with Equation (1) below is greater than the densities of the base material 21 and the surface material 22 and is less than 0.3 g/cm$^3$. Note that "density" in the present invention refers to "density ρ calculated with Equation (1) below".

$$\rho = (W/100^2) \times (10/T) \quad (1)$$

ρ: density (g/cm$^3$)
W: mass per unit area (weight per area) measured in conformity with JIS L 1913 (g/m$^2$)
T: thickness of nonwoven fabric under a load of 0.1 kPa (mm)

Figure 2:
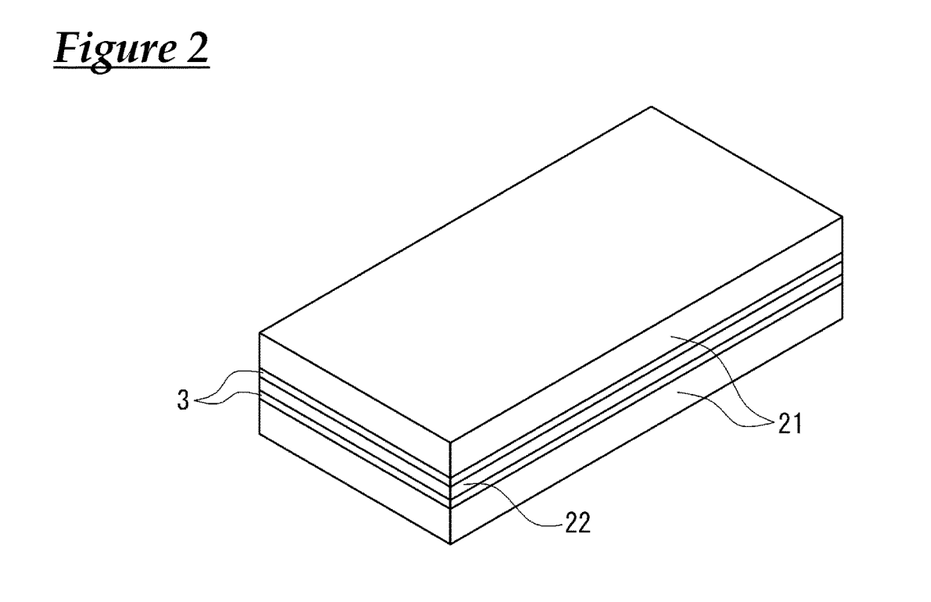
FIG. 2 shows a perspective view of an external appearance of another embodiment of the sound-absorbing material.

The above is merely a suitable configuration of the sound-absorbing material 1, and flame-retardancy improvement effects of the sound-absorbing material 1 are found as long as a flame-retardant material 3 having a density that is higher than that of nonwoven fabric is disposed between the surface material 22 and the base material 21. Also, the sound-absorbing material 1 need not be used with a configuration in which one surface material 22 and one base material 21 are placed on each other, and as shown in FIG. 2, the sound-absorbing material 1 may also be used with a configuration in which a surface material 22 is stacked between two base materials 21. Also, a position at which the surface material 22 is stacked is not necessarily the outermost layer (surface).

Examples of a fiber material that can be used for the base material 21 and the surface material 22 include polyesters such as polyethylene terephthalate and polybutylene terephthalate, polyolefins, nylon, polyamides, polyvinyl chloride, rayon, acryl, acrylonitrile, cellulose, and kenaf.

It is desirable to use olefin-based, polyester-based, or polyamide-based fibers as the fiber material for the flame-retardant material 3. Use of a fiber material provided with a high flame-retardancy as the flame-retardant material 3 makes it possible to effectively increase the overall flame-retardancy of the sound-absorbing material 1.

A fiber diameter of the base material 21 is desirably in a range of 4 to 100 μm, and a fiber diameter of the surface material 22 is desirably in a range of 1 to 50 μm. Although a base material 21 with a narrow fiber diameter has a high sound-absorption performance when used as the nonwoven fabric, if its fiber diameter is too narrow, there is a risk that the nonwoven fabric will be fragile.

Also, spunbonding, spunlacing, needle punching, melt blowing, and the like can be used as the method for manufacturing the base material 21 and the surface material 22.

Although there is no limitation to the fiber diameter of the flame-retardant material 3 or the method for manufacturing the flame-retardant material 3, the flame-retardant material 3 needs to have a fiber composition that does not inhibit the sound-absorption performance of the base material 21 and the surface material 22.

There is no particular limitation to the cross-sectional shape of the fibers of the base material 21, the surface material 22, and the flame-retardant material 3, and core-sheath, cylindrical, hollow, side-by-side fibers and other fibers having modified cross-sectional shapes that are different from those of ordinary fibers may be used.

Figure 3A:
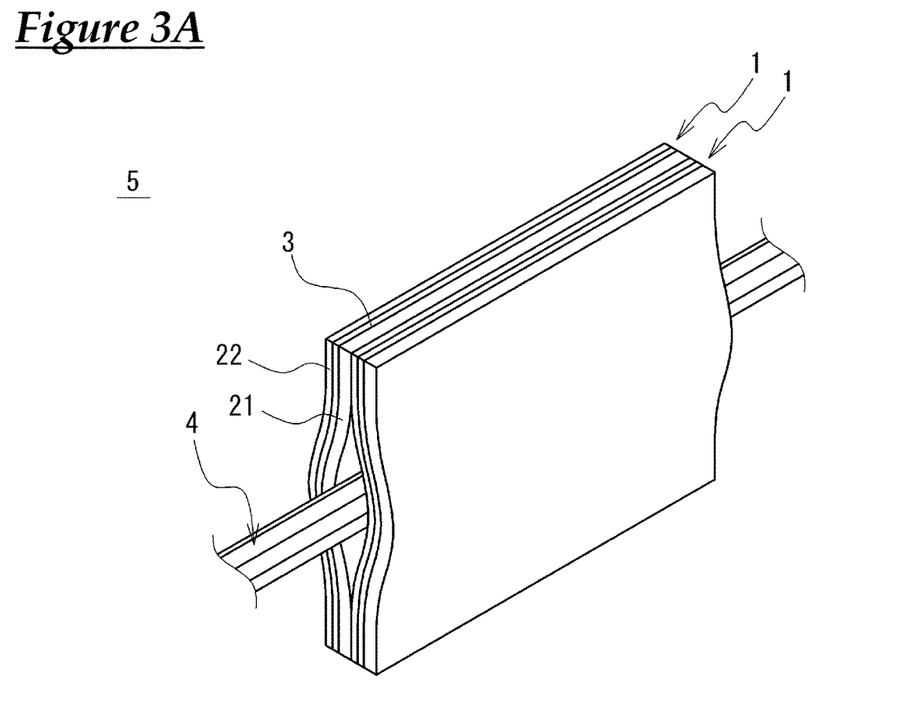
FIG. 3 shows a perspective view of an external appearance of a wire harness provided with the sound-absorbing material.
Figure 3B:
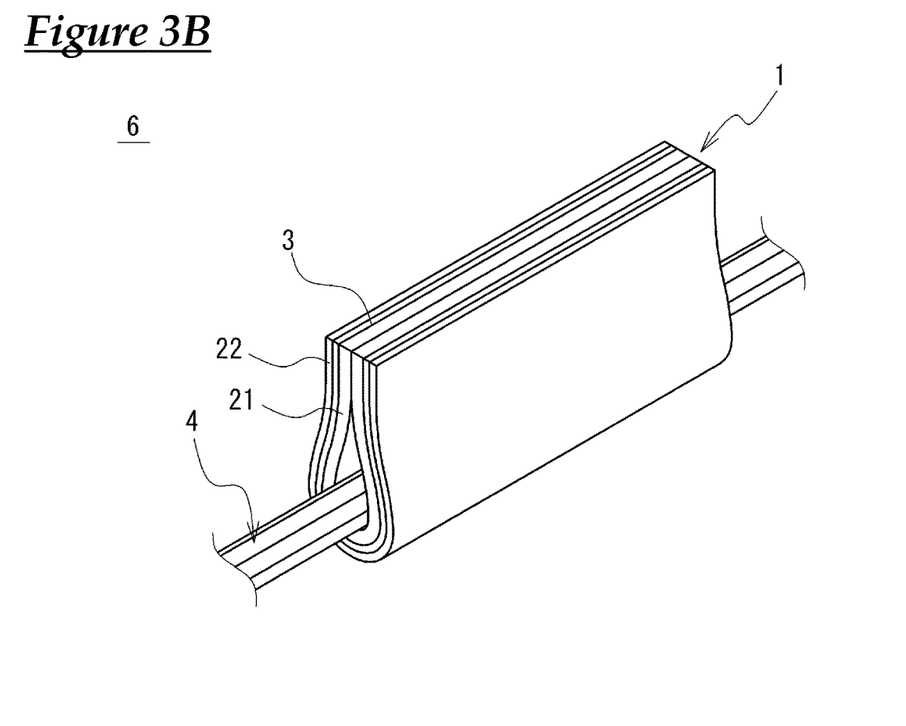

FIG. 3 shows a perspective view of an external appearance of a wire harness provided with the sound-absorbing material. A wire harness provided with a sound-absorbing material 5 in FIG. 3(a) is obtained by integrating a portion of a wire harness 4 extending in the axial direction, with two sound-absorbing materials 1 in a state in which the portion is sandwiched between the two sound-absorbing materials 1, and a wire harness provided with a sound-absorbing material 6 in FIG. 4(b) is obtained by integrating a portion of the wire harness 4 extending in the axial direction, with one sound-absorbing material 1 by wrapping the sound-absorbing material 1 around that portion. The end portions of these sound-absorbing materials 1 are stacked in their thickness direction and the stacked portions are fixed to the wire harness 4 by linking the stacked portions with a stapler, an adhesive, a tag pin, or the like.

Examples of the wire harness 4 include a wire harness obtained by bundling a plurality of electric wires that are obtained by coating a core wire with an insulator and a wire harness constituted by only a single electric wire.

By sandwiching and covering a portion of the wire harness 4, the sound-absorbing material 1 does not only function as the sound-absorbing material but also as a buffer material for the wire harness 4.

WORKING EXAMPLES

Hereinafter, methods for conducting tests on the sound-absorbing material of the present application and their results will be described.

Burning Behaviour Testing and Airflow Rate Measurement

The specifications of the base materials, surface materials, and flame-retardant materials that were used in burning behaviour testing and airflow rate measurement are as follows. A sound-absorbing material obtained by stacking only a base material and a surface material having the specifications below, and a sound-absorbing material obtained by placing a flame-retardant material therebetween were used as the sound-absorbing materials in working examples and comparative examples. Note that the flame-retardant materials that were used in this working example and comparative examples functioned as a thermally fusible sheet, and in the working examples and comparative examples, the base materials and the surface materials in the sound-absorbing materials having flame-retardant materials were bonded with the flame-retardant materials. On the other hand, the base material and the surface material in a sound-absorbing material that had no flame-retardant material were integrated by needle punching.

Base material
Fiber material: fiber obtained by mixing polyester fiber and low-melting polyester fiber
Fiber diameter: Ø 14 μm
Weight per area: 300 g/m$^2$ or 500 g/m$^2$
Thickness: 10 mm
Manufacturing method: needle punching
Surface material
Fiber material: olefin fiber
Fiber diameter: Ø 9 μm
Weight per area: 50 g/m$^2$
Thickness: 1 mm
Manufacturing method: spunbonding
Flame-retardant material
Fiber material: polyester fiber, polyolefin fiber, or polyamide fiber
Weight per area: 30 g/m$^2$
Thickness: 0.1 to 1 mm Specific layer structures and specifications of the sound-absorbing materials that were used in the working examples and comparative examples will be described below. Note that the description in parentheses following the flame-retardant material refers to the fiber material for the flame-retardant material and its thickness, and the description in parentheses following the base material refers to the weight per area of the base material.

Working Example 1: surface material/flame-retardant material (polyester fiber; 0.2 mm)/base material (300 g/m$^2$)

Working Example 2: surface material/flame-retardant material (polyolefin fiber; 0.2 mm)/base material (300 g/m$^2$)

Working Example 3: surface material/flame-retardant material (polyamide fiber; 0.2 mm)/base material (300 g/m$^2$)

Working Example 4: surface material/flame-retardant material (polyester fiber; 0.2 mm)/base material (500 g/m$^2$)

Working Example 5: surface material/flame-retardant material (polyester fiber; 0.5 mm)/base material (300 g/m$^2$)

Comparative Example 1: surface material/base material (300 g/m$^2$)

Comparative Example 2: surface material/base material (500 g/m$^2$)

Comparative Example 3: surface material/base material (300 g/m$^2$)/surface material/base material (300 g/m$^2$)

Comparative Example 4: surface material/flame-retardant material (polyester fiber; 1 mm)/base material (300 g/m$^2$)

Comparative Example 5: surface material/flame-retardant material (polyester fiber; 0.1 mm)/base material (300 g/m$^2$)

Burning behaviour testing was conducted in conformity with the testing method of "Road vehicles, and tractors and machinery for agriculture and forestry-Determination of burning behaviour of interior materials" in JIS D1201. The burning rate was calculated with Equation (2) below, and is given in units of mm/min. As a result of testing, a sound-absorbing material having a burning rate of not more than 50 mm/min was evaluated as "O" and a sound-absorbing material having a burning rate of greater than 50 mm/min was evaluated as "×".

$$B = (s/t) \times 60 \quad (2)$$

B: burning rate (mm/min)

s: burning distance (mm)

t: burning time (seconds)

The airflow rate was measured with the Frazier Air Permeability Testing method in JIS L 1096. Note that samples obtained by stacking two sound-absorbing materials of the working examples and comparative examples were used in measurement. The results of the above-described tests are shown in Table 1. Note that the burning rate of Comparative Example 5 did not reach a measurement point, and thus Comparative Example 5 was evaluated as "O".

TABLE 1

| | Layer structure | Flame-retardant material | | | Base material | Burning behaviour testing | | Airflow rate measurement |
| | | fiber material | thickness (mm) | density (g/cm$^3$) | weight per area (g/m$^2$) | burning rate (mm/min) | evaluation | airflow rate (cm$^3$/cm$^2$ · s) |
|---|---|---|---|---|---|---|---|---|
| Work. Ex. 1 | surface material/ flame-retardant material/ base material | Polyester | 0.2 | 0.15 | 300 | 5 | o | 20 |
| Work. Ex. 2 | surface material/ flame-retardant material/ base material | polyolefin | 0.2 | 0.15 | 300 | 50 | o | 20 |
| Work. Ex. 3 | surface material/ flame-retardant material/ base material | polyamide | 0.2 | 0.15 | 300 | 5 | o | 22 |
| Work. Ex. 4 | surface material/ flame-retardant material/ base material | Polyester | 0.2 | 0.15 | 500 | 7 | o | 21 |
| Work. Ex. 5 | surface material/ flame-retardant material/ base material | Polyester | 0.5 | 0.06 | 300 | 30 | o | 36 |
| Work. Ex. 6 | surface material/ flame-retardant material/ base material | Polyester | 0.1 | 0.3 | 300 | 0 | o | 3 |
| Comp. Ex. 1 | surface material/ base material | — | — | — | 300 | 100 | x | 25 |
| Comp. Ex. 2 | surface material/ base material | — | — | — | 500 | 100 | x | 27 |
| Comp. Ex. 3 | (surface material/ base material) × 2 | — | — | — | 300 | 95 | x | 13 |
| Comp. Ex. 4 | surface material/ flame-retardant material/ base material | Polyester | 1 | 0.03 | 300 | 62 | x | 45 |

Sound-Absorption Performance Testing

Figure 4:
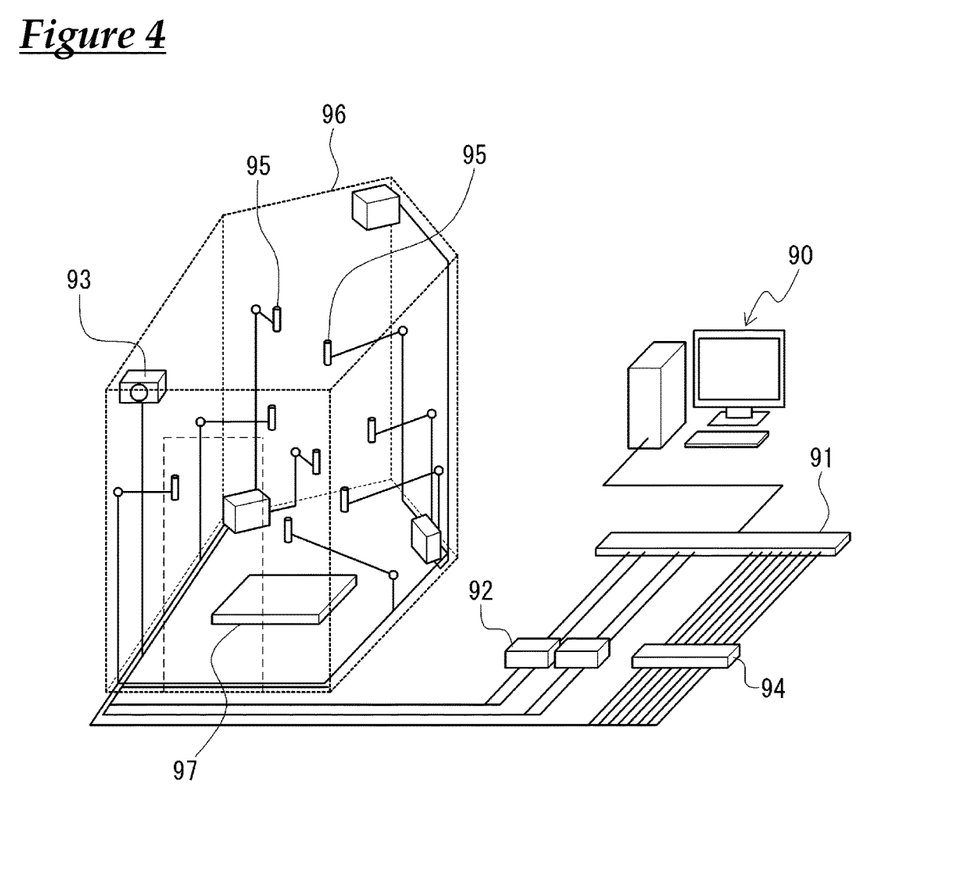
FIG. 4 is a diagram illustrating a measurement apparatus used in testing of sound absorption coefficients in a reverberation room.

In order to evaluate the sound-absorption performance in accordance with the airflow rate of the sound-absorbing material, sound absorption coefficients were measured in a reverberation room using the following test pieces. There measurement results are shown in Table 2 and FIG. 4.

Test Piece

Figure 5:
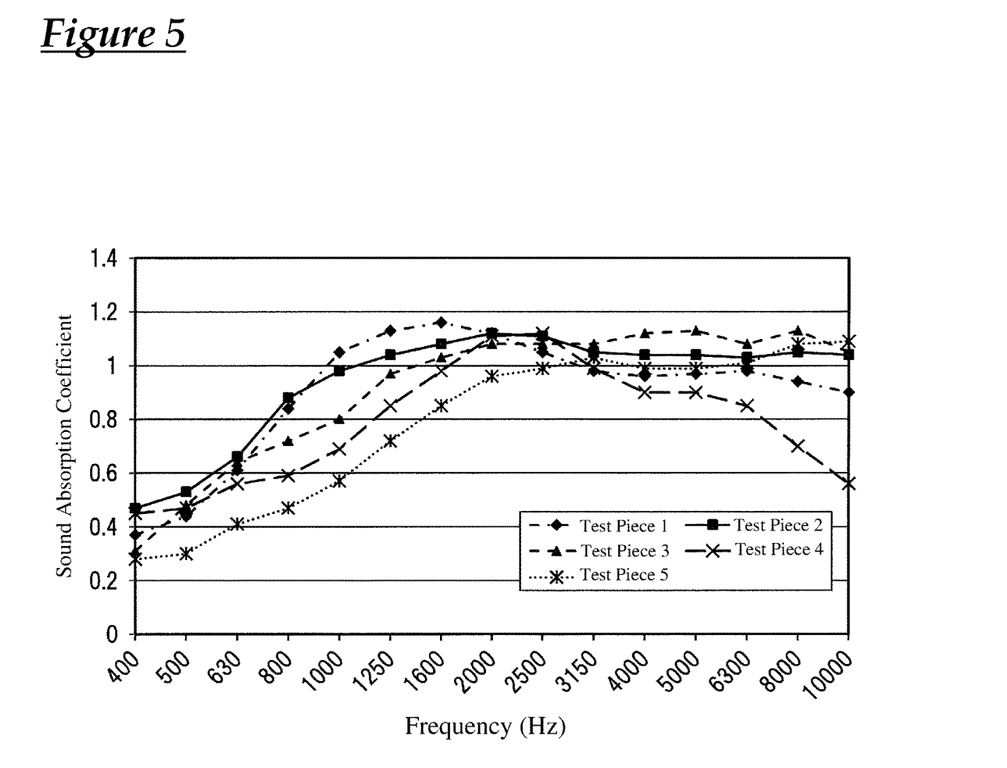
FIG. 5 is a graph showing the results of testing of sound absorption coefficients in a reverberation room.

Layer structure: surface material/flame-retardant material/base material/surface material/flame-retardant material/base material Airflow rate: 5, 27, 50, 2, and 58 cm$^3$/cm$^2$·s Testing for sound absorption coefficients was conducted in conformity with the "Method for measurement of sound absorption coefficients in a reverberation room" in JIS A 1409, and the sound absorption coefficients were obtained with Equation (3) below. As shown in FIG. 5, in the testing, a reverberation room 96 was used in which a speaker 93 that was connected to a personal computer 90 through power amplifiers 92 via an audio interface 91, and microphones 95 connected thereto via a microphone amplifier 94 were disposed at predetermined positions. Measurement was performed by first emitting electrical noise sound from the speaker 93 in a state in which no samples 97 (test pieces) were disposed in the reverberation room 96, stopping the sound, and measuring the sound decay with the microphones 95. Next, the time during which the sound decayed over a range of −5 to −35 dB was obtained from the measured decay curve as a reverberation time T1. The measurement was performed in ⅓ octave bands from a center frequency of 400 Hz to 5000 Hz. Next, a sample 97 having an area of 1 m² was disposed on a floor surface of the reverberation room 96, a reverberation time T2 was obtained similarly to the above, and a sound absorption coefficient (αS) was calculated with Equation (3) below. Note that the value of the sound absorption coefficient means that the greater the sound absorption coefficient is, the better the sample absorbs sound.

$$\alpha S(\text{sound absorption coefficient}) = A/S \quad (3)$$

S: area of sample (m²)
A: equivalent sound absorption area (m²), obtained with Equation (4) below.

$$A = 55.3 \, V/c \cdot [1/T2 - 1/T1] \quad (4)$$

V: volume (m³) of reverberation room in state in which no samples were disposed.
c: sound speed in air (m/s)
T1: reverberation time (s) in reverberation room in state in which no samples were disposed
T2: reverberation time (s) in reverberation room in state in which a sample was disposed

TABLE 2

| | Test piece 1 | Test piece 2 | Test piece 3 | Test piece 4 | Test piece 5 |
|---|---|---|---|---|---|
| | Airflow rate cm³/cm² · s | | | | |
| Frequency (Hz) | 5 | 27 | 50 | 2 | 58 |
| | sound absorption coefficient in reverberation room | | | | |
| 400 | 0.37 | 0.47 | 0.31 | 0.45 | 0.28 |
| 500 | 0.44 | 0.53 | 0.48 | 0.47 | 0.30 |
| 630 | 0.61 | 0.66 | 0.64 | 0.56 | 0.41 |
| 800 | 0.84 | 0.88 | 0.72 | 0.59 | 0.47 |
| 1000 | 1.05 | 0.98 | 0.80 | 0.69 | 0.57 |
| 1250 | 1.13 | 1.04 | 0.97 | 0.85 | 0.72 |
| 1600 | 1.16 | 1.08 | 1.03 | 0.98 | 0.85 |
| 2000 | 1.12 | 1.12 | 1.08 | 1.11 | 0.96 |
| 2500 | 1.05 | 1.11 | 1.08 | 1.12 | 0.99 |
| 3150 | 0.98 | 1.05 | 1.08 | 0.99 | 1.03 |
| 4000 | 0.96 | 1.04 | 1.12 | 0.90 | 0.99 |
| 5000 | 0.97 | 1.04 | 1.13 | 0.90 | 0.99 |
| 6300 | 0.98 | 1.03 | 1.08 | 0.85 | 1.01 |
| 8000 | 0.94 | 1.05 | 1.13 | 0.70 | 1.08 |
| 10000 | 0.90 | 1.04 | 1.05 | 0.56 | 1.09 |

Test Results

Based on the results of sound-absorption performance testing in Table 2 and FIG. 5, it was confirmed that the sound-absorbing materials exhibited a high sound-absorption performance in a wide sound range from low frequencies to high frequencies, when their airflow rates were in a range of 5 to 50 cm³/cm²·s (Test Pieces 1 to 3). Also, it was confirmed that if the airflow rate was less than 5 cm³/cm²·s (Test Piece 4), the sound-absorption performance decreased in a high frequency range, and if the airflow rate exceeded 50 cm³/cm²·s (Test Piece 5), the sound-absorption performance decreased in a low frequency range. Based on these results, it seems that in order to optimize the sound-absorption performance of the sound-absorbing material, it is more desirable to adjust the airflow rate to 5 to 50 cm³/cm²·s.

Next, according to the results of burning behaviour testing in Table 1, the sound-absorbing materials (Working Examples 1 to 6) obtained by placing a flame-retardant material that had a density that is higher than those of the base material and the surface material, between the base material and the surface material had a burning rate of only half or less the burning rate of the sound-absorbing materials (Comparative Examples 1 to 3) obtained by stacking only the base material and the surface material, and flame-retardancy improvement effects were confirmed. Although the sound-absorbing material (Comparative Example 4) using a flame-retardant material whose density was lower than that of the surface material exhibited improved flame-retardancy to some extent, the improved flame-retardancy did not reach the degree required in the present application (burning rate: not more than 50 mm/min).

In the sound-absorbing materials of Working Examples 1, 5, and 6 whose conditions other than their densities were the same, the difference between the burning rates of Working Example 1 (burning rate: 5 mm/min) and Working Example 5 (burning rate: 30 mm/min) was 25 mm/min. Based on this, it is inferred that the flame-retardancy is relatively greatly increased until the density reaches at least about 0.1 g/cm³. Thus, it seems that the density of the flame-retardant material is more desirably not less than 0.1 g/cm³.

On the other hand, with Working Example 6 including a flame-retardant material having a density of 0.3 g/cm³, the burning rate decreased further than the sound-absorbing material of Working Example 1, and thus it is inferred that the burning rate can be reduced by increasing the density of the flame-retardant material, including the working examples (Working Examples 2 and 3) in which fibers other than polyester fiber were used. However, the airflow rate of the sound-absorbing material of Working Example 6 was 3 cm³/cm²·s, and thus the airflow rate was slightly out of a suitable range of the above-described airflow rate (5 to 50 cm³/cm²·s). Thus, it is conceivable that the density of the flame-retardant material is more desirably less than 0.3 g/cm³.

Although embodiments, working examples, and comparative examples of the present application were described in detail above, the present invention is not merely limited to the above-described embodiments or the like, and it will be appreciated that various modifications can be made without departing from the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A sound-absorbing material obtained by stacking a base material made of nonwoven fabric, a flame-retardant material, and a surface material made of nonwoven fabric having a thickness that is smaller than that of the base material,
   wherein the flame-retardant material is a thermally fusible sheet made of nonwoven fabric having a density that is higher than those of the base material and the surface material, the flame-retardant material is disposed between and is bonded to the base material and the surface material, and
   an airflow rate of a stacked nonwoven fabric obtained by stacking the base material, the surface material, and the flame-retardant material is from 5 to 50 cm$^3$/cm$^2$·s.

2. The sound-absorbing material according to claim 1, wherein an olefin-based resin, a polyester-based resin, or a polyamide-based resin is used as a fiber material for the flame-retardant material.

3. The sound-absorbing material according to claim 1, wherein the density of the flame-retardant material is less than 0.3 g/cm$^3$.

4. The sound-absorbing material according to claim 1, wherein at least one layer of the surface material is stacked between a plurality of the base materials.

5. A wire harness provided with a sound-absorbing material,
   wherein a wire harness and the sound-absorbing material according to claim 1 are integrated with each other by covering at least a portion of the wire harness extending in an axial direction, with the sound-absorbing material.

* * * * *